(12) United States Patent
Zhao et al.

(10) Patent No.: US 9,890,900 B2
(45) Date of Patent: Feb. 13, 2018

(54) QUICK GIMBAL CONNECTOR AND AN AERIAL VEHICLE

(71) Applicant: SZ DJI OSMO TECHNOLOGY CO., LTD., Shenzhen (CN)

(72) Inventors: Xifeng Zhao, Shenzhen (CN); Rongjian Sun, Shenzhen (CN); Dahu Pan, Shenzhen (CN); Lixue Ren, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/399,095

(22) Filed: Jan. 5, 2017

(65) Prior Publication Data
US 2017/0114954 A1    Apr. 27, 2017

Related U.S. Application Data

(63) Continuation of application No. PCT/CN2014/081760, filed on Jul. 7, 2014.

(51) Int. Cl.
*F16M 11/04* (2006.01)
*G03B 17/56* (2006.01)
(Continued)

(52) U.S. Cl.
CPC ......... *F16M 13/022* (2013.01); *B64C 39/024* (2013.01); *B64D 47/08* (2013.01);
(Continued)

(58) Field of Classification Search
CPC .... F16M 13/022; F16M 11/041; B64D 47/08; G03B 15/006; G03B 17/561
(Continued)

(56) References Cited

U.S. PATENT DOCUMENTS

| 9,280,038 B1* | 3/2016 | Pan ..................... G03B 17/561 |
| 2006/0033288 A1 | 2/2006 | Hughes et al. |
| 2007/0126872 A1* | 6/2007 | Bolotine .......... G08B 13/19619 348/151 |
| 2008/0210025 A1* | 9/2008 | Goossen ............. F16M 11/041 74/5.34 |

(Continued)

FOREIGN PATENT DOCUMENTS

| AU | 2011376583 A1 | 4/2014 |
| CN | 201676524 U | 12/2010 |

(Continued)

OTHER PUBLICATIONS

The World Intellectual Property Organization (WIPO) International Search Report for PCT/CN2014/081760 dated Feb. 27, 2015, p. 1-6.
(Continued)

*Primary Examiner* — Clayton E LaBalle
*Assistant Examiner* — Leon W Rhodes, Jr.
(74) *Attorney, Agent, or Firm* — Anova Law Group, PLLC

(57) ABSTRACT

A quick gimbal connector comprises: a first cylinder comprising a sliding slot on an inner wall of a first end of the first cylinder, at least one entrance provided at an end portion of the sliding slot, and a first boss provided on the first cylinder; a second cylinder coaxially and rotatably connected with the first cylinder; a connector; at least one rib provided on the connector; and a connecting plate fixedly connected with the second cylinder and being provided with a second boss. The at least one rib is configured to fit with the at least one entrance and can enter into and exit from the sliding slot via the at least one entrance when the first boss abuts against the second boss, such that the first cylinder and the connector can be locked or separated.

17 Claims, 6 Drawing Sheets

(51) Int. Cl.
  *F16M 13/02* (2006.01)
  *F16M 11/06* (2006.01)
  *F16M 11/18* (2006.01)
  *B64D 47/08* (2006.01)
  *G03B 15/00* (2006.01)
  *B64C 39/02* (2006.01)
  *F16M 11/10* (2006.01)
  *F16M 11/20* (2006.01)

(52) U.S. Cl.
  CPC ........... *F16M 11/041* (2013.01); *F16M 11/06* (2013.01); *F16M 11/10* (2013.01); *F16M 11/18* (2013.01); *F16M 11/2071* (2013.01); *G03B 15/006* (2013.01); *G03B 17/561* (2013.01); *F16M 2200/024* (2013.01); *F16M 2200/041* (2013.01); *F16M 2200/044* (2013.01)

(58) Field of Classification Search
  USPC .......................................................... 396/13
  See application file for complete search history.

(56) References Cited

U.S. PATENT DOCUMENTS

2009/0212157 A1  8/2009  Arlton et al.
2012/0305727 A1  12/2012  Bouissiere

FOREIGN PATENT DOCUMENTS

| CN | 201961532 U | 9/2011 | |
| CN | 203528816 U | 4/2014 | |
| CN | 203601575 U | 5/2014 | |
| EP | 1867911 A1 * | 12/2007 | ........... F16M 11/043 |
| JP | 4945690 Y1 | 12/1974 | |
| JP | H08247385 A | 9/1996 | |
| JP | 2001059600 A * | 3/2001 | |
| WO | WO 2016004567 A1 * | 1/2016 | ............. F16M 11/06 |

OTHER PUBLICATIONS

The European Patent Office (EPO) The Extended European Search Report for 14897152.6 dated Jun. 29, 2017 9 Pages.

* cited by examiner

VI—VI

QUICK GIMBAL CONNECTOR AND AN AERIAL VEHICLE

CROSS-REFERENCE TO RELATED APPLICATION

This is a continuation application of International Application No. PCT/CN2014/081760, filed on Jul. 7, 2014, the entire contents of which are incorporated herein by reference.

TECHNICAL FIELD

The present disclosure relates to aerial vehicles, and in particular to a quick gimbal connectors and an aerial vehicle having the quick gimbal connector.

BACKGROUND

The existing gimbals are generally fixed to the aerial vehicles by means of screws. However, a client can determine if a gimbal is to be installed in view of his/her actual requirements. If the gimbal is to be detached from the aerial vehicle, a tool is required because the gimbal cannot be manually detached. Therefore, there is a need to provide a quick connector which enables a quick detachment of a gimbal from an aerial vehicle.

SUMMARY

The object of the present disclosure is to provide a quick connector which enables a quick detachment of a gimbal from an aerial vehicle.

In view of above discussed technical problem, a first aspect of the present disclosure provides a quick gimbal connector. The quick gimbal connector can comprise: a first cylinder comprising a first end and a second end which are opposite to each other in an axial direction; a sliding slot being provided on an inner wall of the first end and extending along a circumferential direction of the inner wall, at least one entrance being provided at an end portion of the sliding slot, and a first boss being provided on an end face of the second end; a second cylinder coaxially and rotatably connected with the first cylinder; a connector detachably mounted between the first cylinder and the second cylinder; at least one rib being provided on a periphery of the connector, the at least one rib being configured to fit with the at least one entrance.

In some embodiments, a side plate can extend from the second end, the side plate can comprise a horizontal part and a vertical part; the first boss can comprise a connecting portion and a shifting portion, the connecting portion can be provided on an end face of the vertical part and can be an arc-shaped rib, the shifting portion can be provided on a periphery of the first cylinder and can be located at a center of the connecting portion; and the first cylinder can rotate around its axis when the shifting portion is shifted.

In some embodiments, a through-hole can be provided at a center of the shifting portion, a plunger can be provided in the through-hole; two plunger holes can be provided on the periphery of the second cylinder, a distance between centers of the two plunger holes can be equal to a length of the connecting portion; when the first cylinder rotates to an extent that the first boss abuts against the second boss, the plunger can be fitted into one of the plunger holes.

In some embodiments, a step surface can extend from the second cylinder, the step surface can be carried on an end face of the horizontal part of the side plate; the step surface can connect the second cylinder with the first cylinder such that the second cylinder is sleeved in the first cylinder.

In some embodiments, the second boss can be an arc-shaped bar provided on the connecting plate, and the second boss can be fitted with an end face of the vertical part of the side plate.

In some embodiments, the quick gimbal connector can further comprise three entrances, the three entrances can be provided on an end portion of the sliding slot which is proximal to the first end, and the connector can be provided with three said ribs which are respectively fitted into the three entrances.

In some embodiments, the inner wall of the first end can be provided with three bar-shaped protrusions which are arranged as a triangle with respect to the axis of the first cylinder; each one of the three bar-shaped protrusions can be an arc-shaped bar, the sliding slot can be formed by the three bar-shaped protrusions and the end face of the horizontal part; the three entrances can be formed between the three bar-shaped protrusions, and the three entrances can be fitted with the three ribs.

In some embodiments, each one of the three ribs can be an arc-shaped rib provided on the periphery of the connector; the three ribs can comprise one first rib and two second ribs, a length of the first rib can be greater than a length of the second rib; and the first rib can prevent a foolproof in connecting the connector with the first cylinder.

In some embodiments, the connecting plate can be provided with a signal receiver, the signal receiver can receive a signal from the aerial device which is connected to the connecting plate.

In some embodiments, the quick gimbal connector can comprise an elastic member which is elastically connected between the connector and the first cylinder in the axial direction.

In some embodiments, the elastic member can be a bumper cushion which is compressed by the first cylinder while connecting the connector with the first cylinder.

In some embodiments, wherein the connector can be provided with two guiding columns, the guiding columns passing through the elastic member and being disposed symmetrically with respect to a center of the elastic member, and the second cylinder can be provided with two guiding holes, the two guiding columns passing through the two guiding holes.

In some embodiments, a connecting plate fixedly connected with the second cylinder is provided. The connecting plate is connected with an aerial device. A second boss is provided at a connection between the connecting plate and the second cylinder, and the second boss is configured to abut against the first boss to limit a rotating of the first cylinder.

In some embodiments, the at least one rib is configured to enter into or exist from the sliding slot via the at least one entrance when the first cylinder is rotated to an extent that the first boss abuts against the second boss, so as to lock the connector with the first cylinder or separate the connector from the first cylinder.

A second aspect of the present disclosure provides an aerial vehicle, comprising: a vehicle body; a quick gimbal connector as described hereinabove; and an imaging device, wherein the vehicle body and the imaging device are respectively connected to two ends of the quick gimbal connector.

The quick gimbal connector of the present disclosure provides at least one entrance on the first cylinder and corresponding at least one rib on the connector. A position limitation is implemented by a mating of the first boss and the second boss. The at least one rib can enter into and exit from the sliding slot via the at least one entrance, such that the first cylinder and the connector can be locked or separated. A quick connection between the first cylinder and the connector can be realized. A utilization of the product and the user's experience can be improved by a simple configuration of the present disclosure.

BRIEF DESCRIPTION OF THE DRAWINGS

Brief description of the drawings will be provided in order to describe the technical solutions of the present disclosure. It will be appreciated the configuration described with reference to the drawings is merely illustrative. Those skilled in the art can conceive other drawings on basis of the appended drawings without creative efforts.

DETAILED DESCRIPTION OF THE EMBODIMENTS

The technical solutions of embodiments of the present disclosure will be described with reference to the appended drawings.

Figure 1:
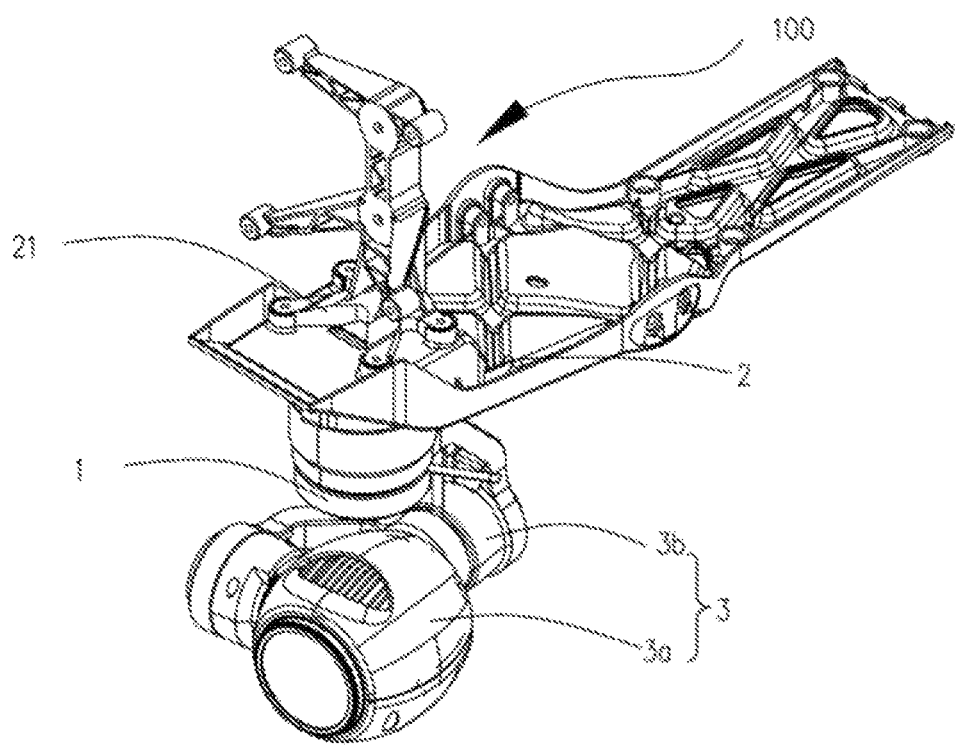
FIG. 1 is a schematic diagram of an aerial vehicle according to an embodiment of the present disclosure.
Figure 2:
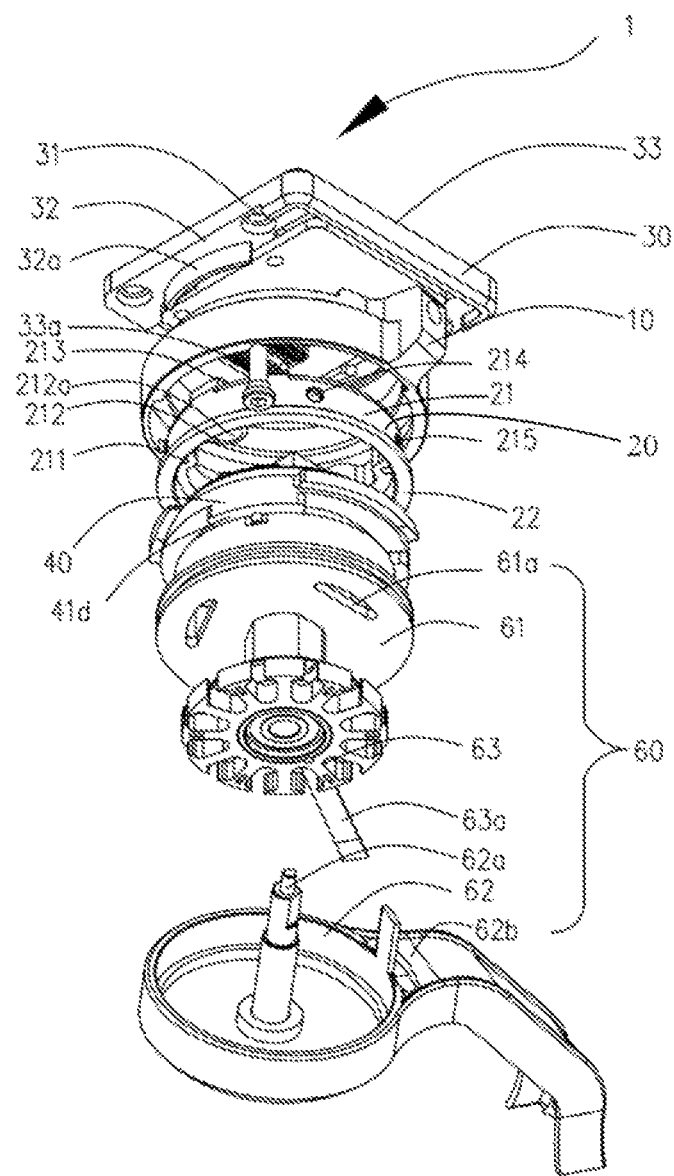
FIG. 2 is an exploded schematic diagram of a quick gimbal connector according to an embodiment of the present disclosure.
Figure 3:
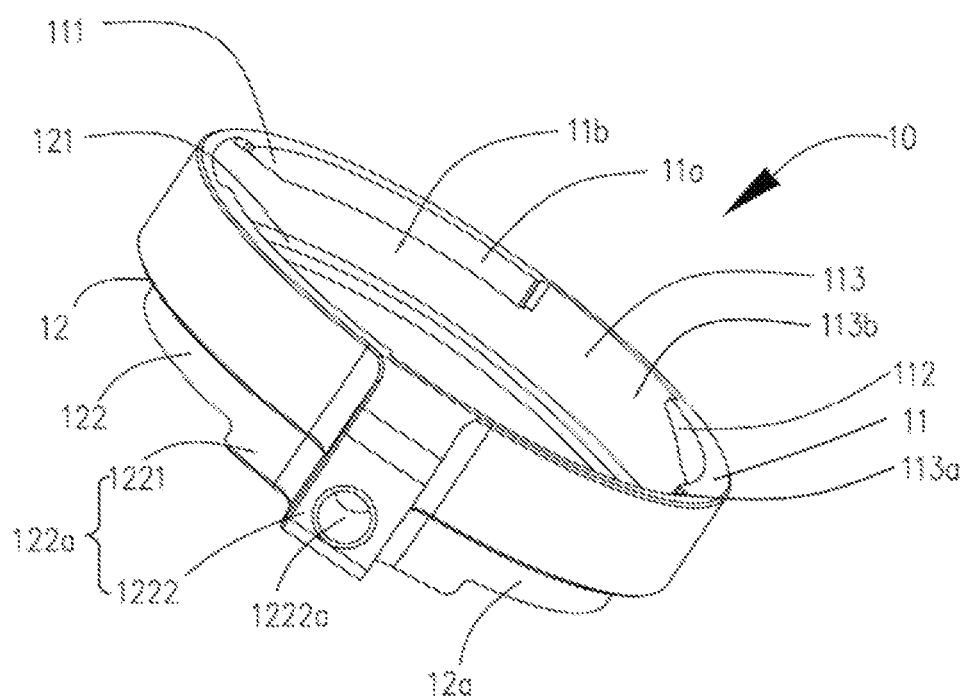
FIG. 3 is a schematic diagram of a first cylinder according to an embodiment of the present disclosure.
Figure 4:
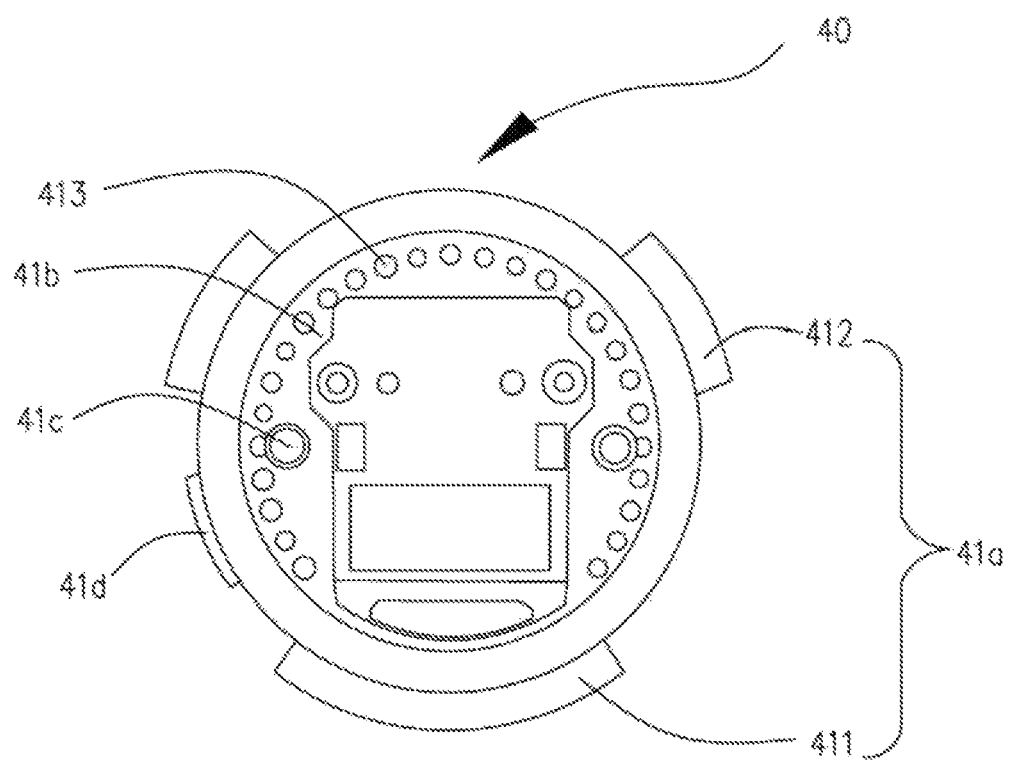
FIG. 4 is a schematic diagram of a connector according to an embodiment of the present disclosure.
Figure 5:
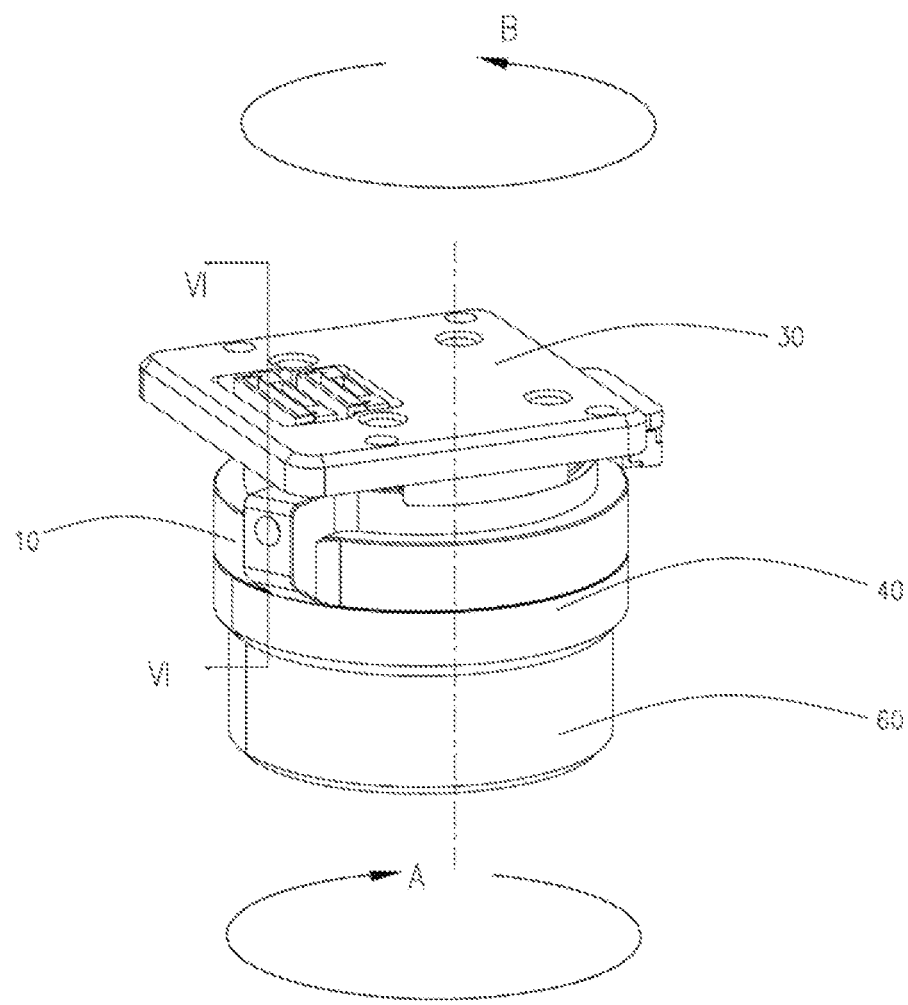
FIG. 5 is a schematic diagram showing an assembly of the quick gimbal connector according to an embodiment of the present disclosure.
Figure 6:
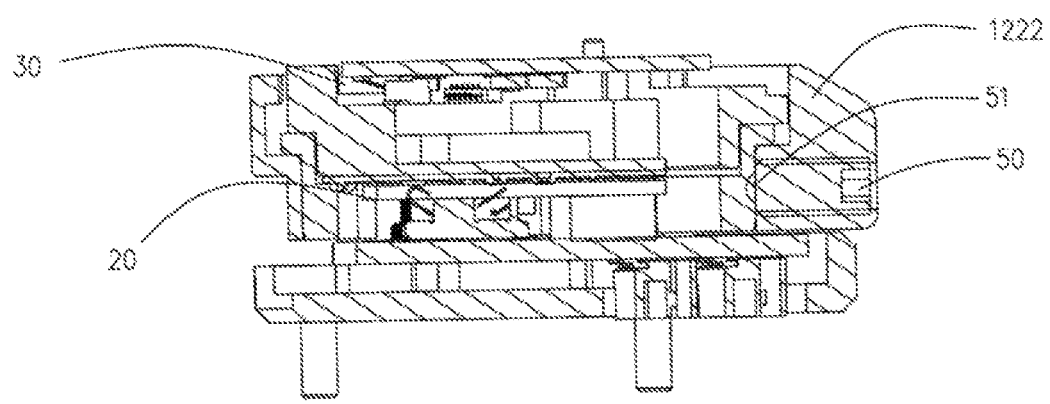
FIG. 6 is a partially cross-sectional view along VI direction in FIG. 5.

Referring to FIG. 1, an embodiment of the present disclosure provides an aerial vehicle 100. The aerial vehicle 100 can comprise a quick gimbal connector 1, a vehicle body 2 and an imaging device 3. The vehicle body 2 and the imaging device 3 can be respectively connected to opposite sides of the quick gimbal connector 1.

Referring to FIGS. 2 to 6, the quick gimbal connector 1 of the present disclosure can comprise a first cylinder 10, a second cylinder 20, a connecting plate 30 and a connector 40. The second cylinder 20 can be coaxially and rotatably connected with the first cylinder 10. The connecting plate 30 can be fixedly connected with the second cylinder 20. The connector 40 can be detachably mounted between the first cylinder 10 and the second cylinder 20.

The first cylinder 10 can be a hollow circular cylinder. The first cylinder 10 can comprise a first end 11 and a second end 12 which are opposite to each other in an axial direction. A side plate 12a can extend from an end face of the second end 12. In some instances, the side plate 12a can have an L-shape. For instance, the side plate 12a can comprise a horizontal part 121 and a vertical part 122. The vertical part 122 can be substantially perpendicular to and connected with the horizontal part 121 and the second end 12. The vertical part 122 can be provided with a first boss 122a. The first boss 122a can comprise a connecting portion 1221 and a shifting portion 1222. The connecting portion 1221 can be provided on an end face of the vertical part 122. In some instances, the connecting portion 1221 can be provided as an arc-shaped rib. The shifting portion 1222 can be provided on a periphery of the first cylinder 10 at a central position of the connecting portion 1221. The shifting portion 1222 can be a trapezoidal boss which protrudes from the periphery of the first cylinder 10. The shifting portion 1222 can be formed integrally with the first cylinder 10. The shifting portion 1222 can facilitate a hand holding of the first cylinder 10. The shifting portion 1222 can be provided with a through-hole 1222a. The through-hole 1222a can be provided at a central portion of the shifting portion 1222.

At least one bar-shaped protrusion 11a can be provided on an inner wall of the first end 11. The bar-shaped protrusion 11a can extend along a circumferential direction of the inner wall of the first end 11. In some embodiments, three bar-shaped protrusions 11a can be provided on the inner wall of the first end 11, each of which being an arc-shaped bar extending along the inner wall of the first end 11. One end of each of the three bar-shaped protrusions 11a can be chamfered to facilitate a connection. The three bar-shaped protrusions 11a can comprise one first bar-shaped protrusion 111 and two second bar-shaped protrusions 112. A length of the first bar-shaped protrusion 111 can be greater than a length of the second bar-shaped protrusions 112. Alternatively, the number of the bar-shaped protrusion 11a can be one, two or four.

A sliding slot 11b can be formed by the three bar-shaped protrusions 11a and an end face of the horizontal part 121 of the side plate 12a. The sliding slot 11b can be an arc-shaped slot extending along the circumferential direction of the inner wall of the first end 11. In some embodiments, the sliding slot 11b can be a circular slot extending along the inner wall of the first end 11.

At least one entrance 113 can be provided at an end of the sliding slot 11b. The entrance 113 can be an arc-shaped slot extending along the circumferential direction of the inner wall of the first end 11. In some embodiments, three entrances 113 can be provided. The three entrances 113 can be formed between every two of the three bar-shaped protrusions 11a. In other words, three entrances 113 can be formed between every two of the one first bar-shaped protrusion 111 and the two second bar-shaped protrusions 112. The three entrances 113 can comprise one first entrance 113a and two second entrances 113b. A length of the first entrance can correspond to the length of the first bar-shaped protrusion 111, such that the length of the first entrance is greater than a length of the second entrances. Alternatively, the number of the entrance 113 can be one, two or four, and the shape of the entrance 113 can be circular, square or U-shaped.

In some embodiments, the second cylinder 20 can be a hollow circular cylinder. The second cylinder 20 can be a flange. The second cylinder 20 can be received in the first cylinder 10. The second cylinder 20 can be coaxially and rotatably connected with the first cylinder 10. The second cylinder 20 can comprise a third end 21 and a fourth end 22 which are disposed opposite to each other in an axial direction. The third end 21 can be in an annular ring. The third end 21 can be provided on its end face with four threaded holes 211. In some instances, the four threaded holes 211 can form a quadrilateral with respect to an axis of the second cylinder 20. Two studs 212 can protrude from an inner wall of the third end 21. The two studs 212 can be disposed symmetrically with respect to the axis of the second cylinder 20. The two studs 212 can each be provided with a guiding through-hole 212a. The two guiding through-holes 212a can provide a guiding when the second cylinder 20 is connected with other components. Two first connecting blocks 213 can be further provided on the end face of the third end 21. The two first connecting blocks 213 can be disposed symmetrically with respect to a center of the second cylinder 20. The two first connecting blocks 213 can be provided adjacent to the two studs 212, respectively. The two first connecting blocks 213 can be square blocks. The two first connecting blocks 213 can provide a supporting and guiding when the second cylinder 20 is connected with other components.

Two plunger holes, for example, a first plunger hole 214 and a second plunger hole 215, can be provided in a circumferential direction of the third end 21. A distance between a center of the first plunger hole 214 and a center of the second plunger hole 215 can be equal to a length of the first boss 122a, so as to facilitate a fitting between the first cylinder 10 and the second cylinder 20.

The fourth end 22 can be a step surface extending outwardly from the third end 21. The fourth end 22 can connect the second cylinder 20 with the first cylinder 10. When the second cylinder 20 is sleeved in the first cylinder 10, the fourth end 22 can be carried on the end face of the horizontal part 121 of the side plate 12a, such that the second cylinder 20 is sleeved in the first cylinder 10 and the second cylinder 20 is prevented from disengaging from the first cylinder 10. Furthermore, the first cylinder 10 can rotate around its axis with respect to the second cylinder 20.

In some instances, the first cylinder 10 can rotate around its axis when the shifting portion 1222 of the first boss 122a is shifted.

The connecting plate 30 can be fixedly connected with the second cylinder 20. The connecting plate 30 can be a thin plate having a square shape. In some instances, the connecting plate 30 can be fixedly connected with the second cylinder 20 by means of a screw. In some embodiments, the connecting plate 30 can be provided with four holes 31 which are respectively fitted with the four threaded holes 211 of the second cylinder 20. Screws can each pass through the holes 31 and corresponding threaded holes 211, so as to fixedly connect the connecting plate 30 with the second cylinder 20.

The connecting plate 30 can comprise a first end face 32 and a second end face 33 which are opposite to each other. The first end face 32 can be an end facing toward the second cylinder 20. The first end face 32 can be provided with two second connecting blocks (not shown). The two second connecting blocks can be disposed symmetrically with respect to a center of the connecting plate 30. The two second connecting blocks can be fitted to the two first connecting blocks 213. When the connecting plate 30 is fixedly connected with the second cylinder 20, the two first connecting blocks 213 can be fitted to the two second connecting blocks. The fitting of the first connecting blocks 213 and the second connecting blocks can provide a supporting and guiding, so as to further tighten a connection between the connecting plate 30 and the second cylinder 20.

A second boss 32a can be provided on the first end face 32. The second boss 32a can be an arc-shaped rib which is provided on the first end face 32. The second boss 32a can be fitted with an end face of the vertical part 122 of the side plate 12a. The second boss 32a can abut against the connecting portion 1221 of the first boss 122a, so as to limit a rotating of the first cylinder 10. When the first cylinder 10 is rotated to an extent that the connecting portion 1221 abuts against the second boss 32a, the first cylinder 10 can be stopped by the second boss 32a.

A signal receiver 33a can be provided on the second end face 33. The signal receiver 33a can receive signals from an aerial device which is attached to the connecting plate 30.

The connector 40 can be detachably connected with the first cylinder 10. In some embodiments, the connector 40 is in a disk-shaped plate. At least one rib 41a can be provided on a periphery of the connector 40. The at least one rib 41a can be fitted with the at least one entrance 113, and can enter into or exit from the sliding slot 11b via the at least one entrance 113. In some instances, three ribs 41a can be provided. The three ribs 41a can be respectively fitted into the three entrances 113.

In some instances, the three ribs 41a each can be an arc-shaped rib provided on the periphery of the connector 40. The three ribs 41a can comprise one first rib 411 and two second ribs 412. A length of the first rib 411 can be greater than a length of the two second ribs 412, so as to be fitted with the first entrance. The first rib 411 can be used to prevent any foolproof in connecting the connector 40 with the first cylinder 10.

In connecting the connector 40 with the first cylinder 10, the first rib 411 can be fitted with the first entrance, and the two ribs 412 can be fitted with the two second entrances, so as to prevent any misalignment between the connector 40 and the first cylinder 10.

In some embodiments, an elastic member 41b can be provided on the connector 40. In some instances, the elastic member 41b can be a circular bumper cushion. In connecting the connector 40 with the first cylinder 10, the elastic member 41b can be compressed by the first cylinder 10, such that a strength of connection between the connector 40 and the first cylinder 10 can be improved. The elastic member 41b can be bonded to the connector 40. For instance, the elastic member 41b can be bonded to the connector 40 by a glue. A plurality of pillars 413 can be provided uniformly along a periphery of the elastic member 41b, which can increase a friction between the connector 40 and the first cylinder 10. Alternatively, the elastic member 41b can be a rubber gasket, a rubber cushion or a silicone cushion.

In connecting the connector 40 with the first cylinder 10, the elastic member 41b can be compressed by a pressure from the first cylinder 10, such that the connector 40 is further connected with the first cylinder 10, ensuring a connection tightness there between. Since the elastic member 41b is provided with pillars 413 thereon, the elastic member 41b can be further compressed, such that a friction between the first cylinder 10 and the connector 40 can be increased and thus a strength of connection can be increased. If an aerial device is connected to the connecting plate 30, the aerial device may vibrate due to an air resistance during the flight. In this case, the elastic member 41b can reduce a vibration experienced by the aerial device to smooth a flight of the aerial device.

The connector 40 can also be provided with two guiding columns 41c. The guiding columns 41c can pass through the elastic member 41b and be disposed symmetrically with respect to a center of the elastic member 41b. The two guiding columns 41c can pass through the two guiding through-holes 212a of the second cylinder 20, respectively, allowing the connector 40 being linearly connected with the first cylinder 10, thus improving a smoothness in the connecting.

The connector 40 can be provided with three tabs 41d. The tabs 41d can be provided on an end face of the connector 40 which is remote from the elastic member 41b. The three tabs 41d each can be an arc-shaped rib extending along a periphery of the connector 40.

When the first cylinder 10 is rotated to an extent that the connecting portion 1221 of the first boss 122a abuts against the second boss 32a, the three ribs 41a can enter into or exit from the sliding slot 11b via the three entrances 113, such that the connector 40 and the first cylinder 10 can be locked or separated.

In some embodiments, when the three ribs 41a are located in the sliding slot 11b and the first cylinder 10 is rotated in a first direction A to an extent that the first boss 122a abuts against the second boss 32a, the connector 40 is locked with the first cylinder 10.

When the first cylinder 10 is rotated in a second direction B to an extent that the first boss 122a abuts against the second boss 32a, the three ribs 41a can slide in the sliding slot 11b to positions corresponding to the three entrances 113. The three ribs 41a can exit from the sliding slot 11b via the three entrances 113, such that the connector 40 is separated from the first cylinder 10. Therefore, the connector 40 and the first cylinder 10 can be quickly locked and separated.

The first direction A can be opposite to the second direction B. In some embodiments, as seen from the view point illustrated in FIG. 5, the first direction A can be a counter-clockwise direction, and the second direction B can be a clockwise direction. Alternatively, the first direction A can be a clockwise direction, while the second direction B can be a counter-clockwise direction.

The quick gimbal connector 1 can comprise a plunger 50 which is provided at the shifting portion 1222. In some embodiments, the plunger 50 can be provided in the through-hole 1222a. The plunger 50 can comprise a tip portion 51. In some instances, the tip portion 51 can be provided in spherical structure. When the first cylinder 10 is rotated to an extent that the first boss 122a abuts against the second boss 32a, the tip portion 51 of the plunger 50 can be fitted into the first plunger hole 214 or the second plunger hole 215.

In some instances, when the first cylinder 10 is rotated in the first direction A to an extent that the first boss 122a abuts against the second boss 32a, the connector 40 can be locked with the first cylinder 10, the tip portion 51 can be fitted into the first plunger hole 214 and a sound can be generated. The user can thus easily determine the locked state between the connector 40 and the first cylinder 10, such that the user's experience is improved. When the first cylinder 10 is rotated in the second direction B to an extent that the first boss 122a abuts against the second boss 32a, the connector 40 can be separated from the first cylinder 10, the tip portion 51 can be fitted into the second plunger hole 215 and a sound can be generated. The user can thus easily determine the separated condition between the first cylinder 10 and the connector 40. Since a sound is generated when the plunger 50 is fitted into the first plunger hole 214 or the second plunger hole 215, the user can experience an improved operation when shifting the shifting portion 1222, thereby improving the user experience in operating the device of the present disclosure.

The quick gimbal connector 1 can comprise an adaptor 60 which is connected with the connector 40. In some instances, the adaptor 60 can comprise an adapting plate 61 and a housing 62. The adapting plate 61 can be connected with the connector 40, and the housing 62 can be connected with the adapting plate 61.

In some embodiments, the adapting plate 61 can be a circular plate. The adapting plate 61 can be snapped with the connector 40 for an easy detachment. Three snap slots 61a can be provided to the adapting plate 61 in correspondence to the connector 40. Each one of the snap slots 61a can be an arc-shaped slot. The three snap slots 61a can be snapped with the three tabs 41d, respectively, such that adapting plate 61 can be easily connected with the connector 40. Alternatively, the adapting plate 61 can be connected with the connector 40 by other means such as a threaded connection, a soldering connection or a screwed connection.

The adaptor 60 can comprise a housing 62. The housing 62 can be connected with the adapting plate 61 by a threaded connection. In some embodiments, the housing 62 can be provided with an inner thread (not shown), while the adapting plate 61 can be provided with a corresponding outer thread, such that the housing 62 can be connected with the adapting plate 61 by a threaded connection. A rotating shaft 62a can be provided within the housing 62. The rotating shaft 62a can be provided at a central position of the housing 62. The rotating shaft 62a can drive a rotation of those components which are connected to the housing 62.

A rotation arm 62b can be provided on a periphery of the housing 62. The rotation arm 62b can be formed integrally with the housing 62 for an easy manufacturing. The rotation arm 62a can comprise one end provided on the periphery of the housing 62, and another end connected with other components such as an imaging device.

An electrical box 63 can be received in a receiving cavity of the housing 62. The electrical box 63 can accommodate a flexible printed circuit (FPC) flat cable 63a. An end of the FPC flat cable 63a can be wound around the rotating shaft 62a. The FPC flat cable 63a can rotate as the rotating shaft 62 rotates.

Referring to FIG. 1, the vehicle body 2 can be connected to an end of the quick gimbal connector 1. The vehicle body 2 can comprise a connecting bracket 21 and a signal transmitter (not shown). The connecting bracket 21 can be fixedly connected with the connecting plate 30. The signal transmitter can be provided within the connecting bracket 21.

In some embodiments, the connecting bracket 21 can be fixedly connected with the connecting plate 30 by means of a screw for an easy detachment. If the imaging device 3 is not to be carried by the aerial vehicle 100, the user can rotate the quick gimbal connector 1 to an extend that the first boss 122a abuts against the second boss 32a and the three ribs 41a exit from the sliding slot 11b via the three entrances 113, such that the connector 40 can be separated from the first cylinder 10, and the imaging device 3 can be separated from the vehicle body 2. In this way, the imaging device can be quickly attached to or detached from the aerial vehicle, and an adaptability of the product can be improved satisfy user's requirements.

In sense of signal transmission, the signal transmitter can be provided at an end of the connecting bracket 21 proximal to the signal receiver 33a, so as to facilitate a transmission of the signal to the signal receiver 33a.

The imaging device 3 can be rotatably connected to an end of the quick gimbal connector 1 remote from the vehicle body 2. In some instances, the imaging device 3 can be rotatably connected to the rotation arm 62a. The imaging device 3 can comprise a camera 32 and a rotation shaft 3b. The rotation shaft 3b can be rotatably connected to the rotation arm 62a. The camera 3a can be rotated as the rotation arm 62 rotates, such that the camera 3a can capture images from various orientations.

The quick gimbal connector of the present disclosure provides at least one entrance on the first cylinder and corresponding at least one rib on the connector. A position limitation is implemented by a mating of the first boss and the second boss. The at least one rib can enter into and exit from the sliding slot via the at least one entrance, such that the first cylinder and the connector can be locked or separated. A quick connection between the first cylinder and the connector can be realized. A utilization of the product and the user's experience can be improved by a simple configuration of the present disclosure.

The foregoing disclosure is merely illustrative of the embodiments of the disclosure but not intended to limit the scope of the disclosure. Any equivalent modifications to a structure or process, which are made without departing from the specification and the drawings of the disclosure, shall also fall into the scope of the disclosure.

What is claimed is:

1. A quick gimbal connector, comprising:
a first cylinder comprising:
a first end and a second end which are opposite to each other in an axial direction;
a sliding slot being provided on an inner wall of the first end and extending along a circumferential direction of the inner wall;
at least one entrance being provided at an end portion of the sliding slot; and
a first boss being provided on an end face of the second end;
a second cylinder received in the first cylinder and being coaxially and rotatably connected with the first cylinder;
a connector detachably mounted between the first cylinder and the second cylinder;
at least one rib being provided on a periphery of the connector, the at least one rib being configured to fit with the at least one entrance;
a connecting plate fixedly connected with the second cylinder, the connecting plate being configured to connect with an aerial device; wherein
the connecting plate comprises a second boss being provided at a connection between the connecting plate and the second cylinder, the second boss being configured to abut against the first boss to limit a rotating of the first cylinder.

2. The quick gimbal connector of claim 1, wherein a side plate extends from the second end, the side plate comprises a horizontal part and a vertical part; the first boss comprises a connecting portion and a shifting portion, the connecting portion is provided on an end face of the vertical part and is an arc-shaped rib, the shifting portion is provided on a periphery of the first cylinder and is located at a center of the connecting portion; and the first cylinder rotates around its axis when the shifting portion is shifted.

3. The quick gimbal connector of claim 2, wherein a through-hole is provided at a center of the shifting portion, a plunger is provided in the through-hole; two plunger holes are provided on a periphery of the second cylinder, a distance between centers of the two plunger holes is equal to a length of the connecting portion.

4. The quick gimbal connector of claim 2, wherein a step surface extends from the second cylinder, the step surface is carried on an end face of the horizontal part of the side plate; the step surface connects the second cylinder with the first cylinder such that the second cylinder is sleeved in the first cylinder.

5. The quick gimbal connector of claim 1, wherein the second boss is an arc-shaped bar provided on the connecting plate.

6. The quick gimbal connector of claim 2, wherein the quick gimbal connector further comprises three entrances, the three entrances are provided on an end portion of the sliding slot which is proximal to the first end, and the connector is provided with three said ribs which are respectively fitted into the three entrances.

7. The quick gimbal connector of claim 6, wherein the inner wall of the first end is provided with three bar-shaped protrusions which are arranged as a triangle with respect to the axis of the first cylinder; each one of the three bar-shaped protrusions is an arc-shaped bar, the sliding slot is formed by the three bar-shaped protrusions and an end face of the horizontal part; and the three entrances are formed between the three bar-shaped protrusions.

8. The quick gimbal connector of claim 7, wherein each one of the three ribs is an arc-shaped rib provided on the periphery of the connector; the three ribs comprise one first rib and two second ribs, a length of the first rib being greater than a length of the second rib; and the first rib prevents a foolproof in connecting the connector with the first cylinder.

9. The quick gimbal connector of claim 1, wherein the quick gimbal connector comprises an elastic member which is elastically connected between the connector and the first cylinder in the axial direction.

10. The quick gimbal connector of claim 9, wherein the elastic member is a bumper cushion which is compressed by the first cylinder while connecting the connector with the first cylinder.

11. The quick gimbal connector of claim 10, wherein the connector is provided with two guiding columns, the guiding columns passing through the elastic member and being disposed symmetrically with respect to a center of the elastic member; and the second cylinder is provided with two guiding holes, the two guiding columns passing through the two guiding holes.

12. The quick gimbal connector of claim 1, wherein the at least one rib is configure to enter into or exist from the sliding slot via the at least one entrance when the first cylinder is rotated to an extent that the first boss abuts against the second boss, so as to lock the connector with the first cylinder or separate the connector from the first cylinder.

13. The quick gimbal connector of claim 1, wherein a side plate extends from the second end, the side plate comprises a horizontal part and a vertical part; the first boss comprises a connecting portion and a shifting portion, the connecting portion is provided on an end face of the vertical part and is an arc-shaped rib, the shifting portion is provided on a periphery of the first cylinder and is located at a center of the connecting portion; and the first cylinder rotates around its axis when the shifting portion is shifted.

14. The quick gimbal connector of claim 13, wherein a through-hole is provided at a center of the shifting portion, a plunger is provided in the through-hole; two plunger holes are provided on a periphery of the second cylinder, a distance between centers of the two plunger holes is equal to a length of the connecting portion; when the first cylinder rotates to an extent that the first boss abuts against the second boss, the plunger is fitted into one of the plunger holes.

15. The quick gimbal connector of claim 1, wherein the connecting plate is provided with a signal receiver, the signal receiver receives a signal from the aerial device which is connected to the connecting plate.

16. An aerial vehicle, comprising:
a vehicle body;
an imaging device; and
a quick gimbal connector, comprising:
a first cylinder comprising:
a first end and a second end which are opposite to each other in an axial direction;

a sliding slot being provided on an inner wall of the first end and extending along a circumferential direction of the inner wall;

at least one entrance being provided at an end portion of the sliding slot; and a first boss being provided on an end face of the second end;

a second cylinder received in the first cylinder and being coaxially and rotatably connected with the first cylinder;

a connector detachably mounted between the first cylinder and the second cylinder;

at least one rib being provided on a periphery of the connector, the at least one rib being configured to fit with the at least one entrance;

a connecting plate fixedly connected with the second cylinder, the connecting plate being configured to connect with the vehicle body; and a second boss being provided at a connection between the connecting plate and the second cylinder, the second boss being configured to abut against the first boss to limit a rotating of the first cylinder, wherein the vehicle body and the imaging device are respectively connected to two ends of the quick gimbal connector.

17. The aerial vehicle of claim 16, wherein the at least one rib is configured to enter into or exist from the sliding slot via the at least one entrance when the first cylinder is rotated to an extent that the first boss abuts against the second boss, so as to lock the connector with the first cylinder or separate the connector from the first cylinder.

* * * * *